United States Patent [19]
Takagi

[11] Patent Number: 5,239,333
[45] Date of Patent: Aug. 24, 1993

[54] CAMERA EXPOSURE CALCULATION DEVICE DEPENDENT ON TYPE OF SCENE TO BE PHOTOGRAPHED

[75] Inventor: Tadao Takagi, Yokohama, Japan

[73] Assignee: Nikon Corporation, Tokyo, Japan

[21] Appl. No.: 936,887

[22] Filed: Aug. 28, 1992

Related U.S. Application Data

[63] Continuation of Ser. No. 635,241, Dec. 28, 1990, abandoned.

[30] Foreign Application Priority Data

Jan. 5, 1990 [JP] Japan .................................. 2-111

[51] Int. Cl.⁵ .......................... G03B 7/28; G03B 13/36
[52] U.S. Cl. ..................................... 354/402; 354/432
[58] Field of Search .......................... 354/402, 429–434

[56] References Cited
U.S. PATENT DOCUMENTS

| | | | |
|---|---|---|---|
| 4,075,640 | 2/1978 | Ueda et al. ......................... | 354/432 |
| 4,364,650 | 12/1982 | Terashita et al. .................... | 354/432 |
| 4,445,778 | 5/1984 | Nakauchi ......................... | 354/432 X |
| 4,534,639 | 8/1985 | Konishi et al. .................. | 354/432 X |
| 4,774,401 | 9/1988 | Yamada et al. .................. | 354/432 X |
| 4,972,222 | 10/1990 | Sato et al. ............................. | 354/432 |

*Primary Examiner*—W. B. Perkey
*Attorney, Agent, or Firm*—Shapiro and Shapiro

[57] ABSTRACT

A camera comprises a light metering device for measuring brightnesses of a plurality of light metering areas of an object field in response to light from the object field to generate brightness outputs, a photographing scene setting device for setting a photographing scene and producing photographing scene information, a selection device for selecting a brightness output to be used for exposure calculation from the brightness outputs based on the output of the photographing scene setting device, and an exposure calculation device for calculating an exposure value based on the brightness output selected by the selection device.

11 Claims, 5 Drawing Sheets

CAMERA EXPOSURE CALCULATION DEVICE DEPENDENT ON TYPE OF SCENE TO BE PHOTOGRAPHED

This is a continuation of application Ser. No. 635,241 filed Dec. 28, 1990, now abandoned.

BACKGROUND OF THE INVENTION

1. Field of the Invention

The present invention relates to a camera exposure calculation device.

2. Related Background Art

It is significant in setting a proper exposure to obtain information relating to a type of a principal object, for example, an object to be photographed by close-up, person or scenery, as information for the calculation of exposure. In U.S. Ser. No. 277,867 filed on Nov. 30, 1988 and assigned to the assignee of the present invention, now U.S. Pat. No. 4,951,082 issued Aug. 21, 1990, the principal object is classified by a photographing magnification and a proper exposure is calculated based on the classification result. More specifically, when the magnification f/x is smaller than 1/100, it is classified as a scenery scene, when the magnification is $1/100 \leq f/x < 1/20$, it is classified as a person scene, and when the magnification is $1/20 \leq f/x$, it is classified as a close-up scene. After the classification, appropriate calculation is effected to calculate the exposure.

In the prior art, the classification of the scene is based on the assumption that the scene has a large number in a collection of statistics. However, a different scene from the statistically set scene classification naturally occurs in a range. Accordingly, in the scene classification method, a certain range of misjudgement is included by probability.

SUMMARY OF THE INVENTION

In the light of the above, it is an object of the present invention to improve a probability of attaining a proper exposure by eliminating misjudgement by classification by not depending on the scene classification.

In order to achieve the above object, a camera exposure calculation device of the present invention comprises a light metering device for measuring brightnesses of a plurality of light metering areas in an object field in response to light from the object field to generate brightness outputs, a photographing scene setting device for setting a photographing scene and supplying photographing scene information, a selection device for selecting a brightness output to be used for exposure calculation from the brightness outputs based on the output of the photographing scene setting device, and an exposure calculation device for calculating an exposure value based on the brightness output selected by the selection device.

In the present invention, the brightness output to be used for the exposure calculation is selected from the brightness outputs generated by the light metering device based on the output of the photographing scene setting device which is set by a photographer. Accordingly, the range of the principal object can be more precisely determined than by the classification method.

DETAILED DESCRIPTION OF THE PREFERRED EMBODIMENTS

An embodiment of the present invention is now explained with reference to FIG. 1.

Figure 1:
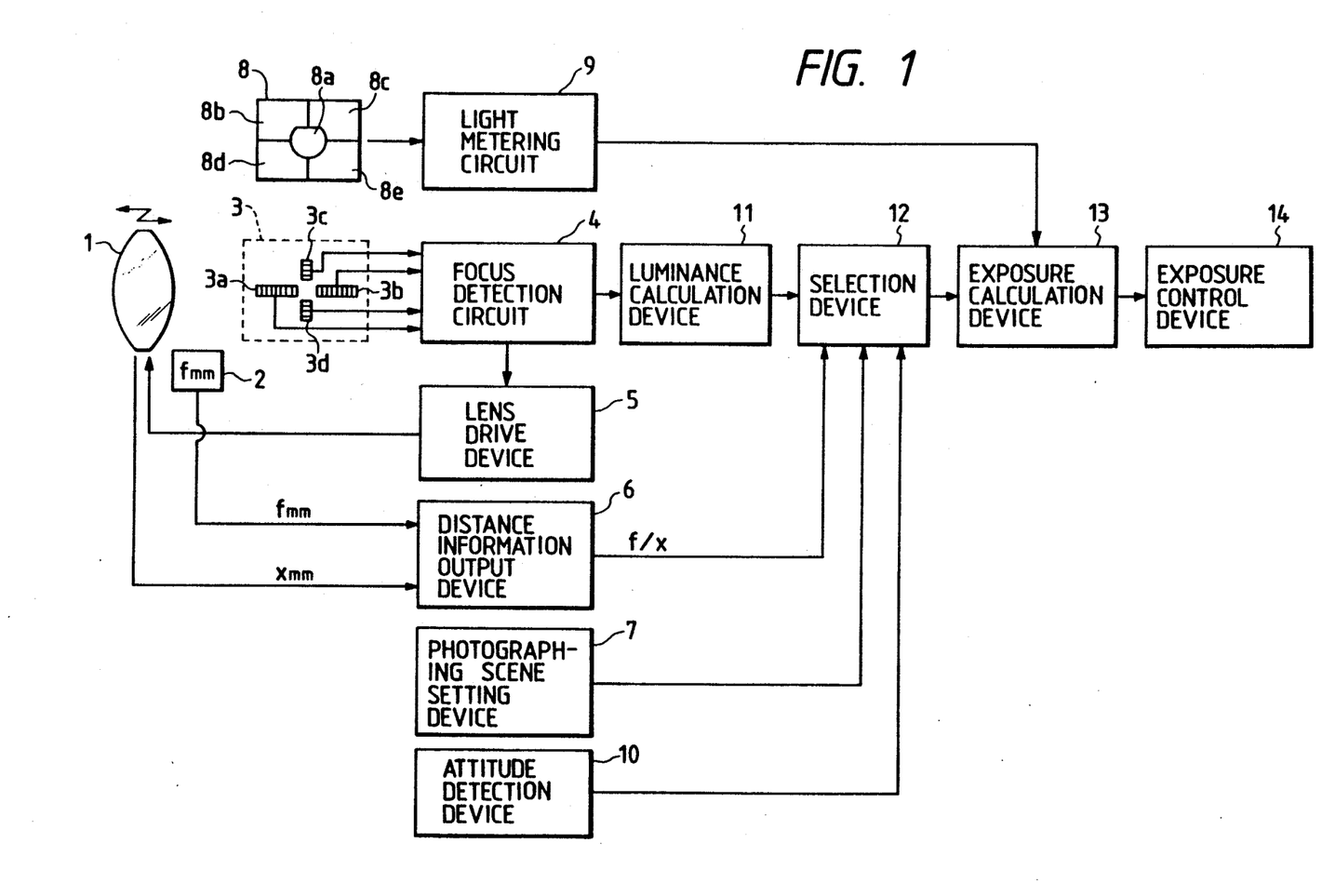
FIG. 1 shows a block diagram of an embodiment of the present invention.

FIG. 1 shows a block diagram of the embodiment of the present invention. An imaging lens 1 receives light from an object field. The incident light passes through the imaging lens 1 and is split by a half-mirror (not shown) in a known manner. One portion of the light is directed to a light metering element 8 and the other portion is directed to photo-electric conversion device arrays 3 for detecting focus, through a known optical system (not shown).

A ROM 2 in the lens stores a focal distance f (mm) of the imaging lens 1.

Figure 4:
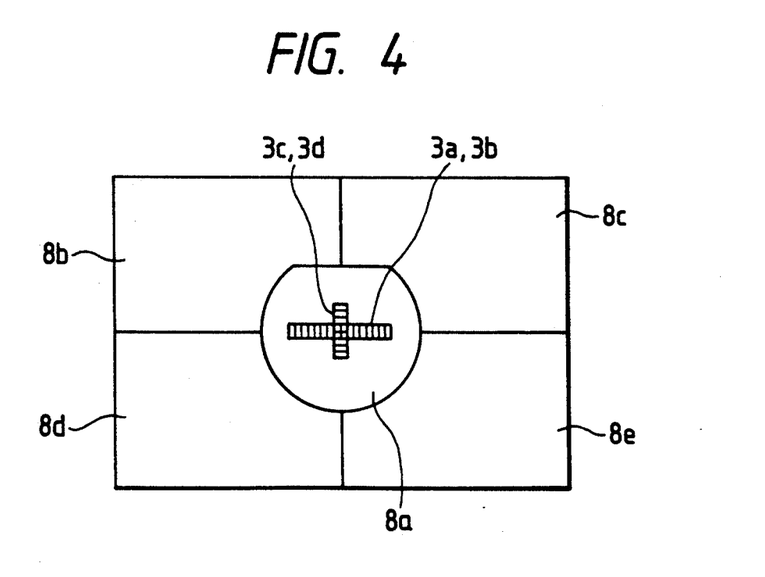
FIG. 4 shows a positional relationship between an image screen and the photo-electric conversion device arrays 3.

The light metering element 8 is a photo-electric conversion device made of a silicon photo-diode (SPD) which generates a light metering output in response to light from an object. An object field is divided into five areas and five photo-electric conversion devices 8a to 8e corresponding to each area, respectively are provided. Positions on an image screen of the five photo-electric conversion devices 8a to 8e are shown in FIG. 4.

A light metering circuit 9 receives the light metering outputs from the five photo-electric conversion devices 8a to 8e, calculates respective brightnesses and generates corresponding brightness outputs.

A light metering device (a portion of which is not shown) primarily comprises the light metering element 8 and the light metering circuit 9.

The photo-electric conversion device arrays 3 are used for detecting focus. They comprises a pair of photo-electric conversion device arrays 3a and 3b arranged horizontally on the corresponding screen, and a pair of photo-electric conversion device arrays 3c and 3d arranged vertically, that is, four photo-electric conversion device arrays in total. Each photo-electric conversion device array comprises a plurality of parallel charge storing photo-electric conversion devices (CCD) (hereinafter simply referred to as devices).

The four photo-electric conversion device arrays are arranged on a plane on which light transmitted through the imaging lens 1 focused through four recoupling lenses (not shown) arranged in a cross shape. The images of the four photo-electric conversion device arrays on the screen or the predetermined focal plane of the imaging lens 1, i.e., the images of the pair of horizontally arranged photo-electric conversion device arrays 3a and 3b and the pair of vertically arranged photo-electric conversion device arrays 3c and 3d, overlap each other, respectively, to form a cross area shown in FIG. 4. This area is a subject of distance measurement This is disclosed in U.S. Ser. No. 370,993 filed on Sep. 26, 1989, abandoned in favor of continuation application Ser. No. 497,779, filed Mar. 21, 1990, now U.S. Pat. No. 4,982,219 issued Jan. 1, 1991, and assigned to the assignee of the present invention.

Photo-electrically converted outputs generated by the devices of the photo-electric conversion device arrays 3 are supplied to a focus detection circuit 4. Normally, the same number of photo-electrically converted outputs as the number of devices of the photo-electric conversion device arrays 3 are supplied. A calculation is carried out to detect the focus.

A focus detection device (a portion of which is not shown) primarily comprises photo-electric conversion device arrays 3 and the focus detection circuit 4.

The outputs from the photo-electric conversion device arrays 3 are supplied to the focus detection circuit 4 which generates focus detection outputs, which are sent to a lens driver 5 as focal position information.

A lens drive motor (not shown) which is a component of the lens driver 5 is driven in accordance with the focus detection result so that the imaging lens 1 is driven to a detected in-focus position.

A brightness calculation device 11 calculates brightness values based on the photo-electrically converted outputs and produces corresponding brightness outputs. In the present embodiment, a storage time required for each device to store a predetermined amount of charge is detected, and the brightness value is calculated by dividing the stored charge by the storage time. However, the present invention is not limited to the above method. For example, the charge stored in a predetermined time may be converted to a brightness value. A reference device (not shown) or a color temperature measuring device (not shown) may be provided as required to correct the brightness value.

The brightness outputs calculated by the brightness calculation device 11 and the focus detection output are supplied to the selection device 12.

A distance information output device 6 provides a photographing magnification of the driven imaging lens 1, which is calculated from a distance x (mm) from an aperture plane of a camera to an object, through the imaging lens 1 and a focal distance f (mm) of the imaging lens 1 through the ROM 2 in the lens. The focal distance f (mm) is divided by the distance x (mm) to calculate a photographing magnification f/x, and a photographing magnification output is sent to the selection device 12. The distance information is not limited to the one described above but an exit pupil distance may be used.

A photographing scene setting device 7 is used by a photographer to set various photographing scenes such as portrait, sport, scenery, close-up and evening scene. The camera controls an aperture, a shutter speed, an exposure value and an angle of view in accordance with the setting. An individual electric or magnetic card may be selectively inserted into the camera to set the scene, or a setting member mounted on the camera may be manipulated to select and set the scene. The photographing scene setting device 7 produces a signal representing the result of setting and supplies it to the selection device 12.

An attitude detection device 10 detects an attitude of the camera, for example, a horizontal attitude or a vertical attitude, by a known vertical attitude sensor and sends the detection result to the selection device 12.

The selection device 12 selects a brightness output from the brightness outputs supplied from a brightness conversion device 11 based on the outputs of the distance information output device 6, the photographing scene setting device 7 and the attitude detection device 10, and sends it to an exposure calculation device 13.

The exposure calculation device 13 receives the selected brightness output and the outputs of the five photo-electric conversion devices 8a to 8e from the light metering circuit 9 and calculates a proper exposure value, and supplies it to an exposure control device 14.

The exposure control device 14 controls a shutter (not shown) and an aperture (not shown) in accordance with the proper exposure value.

Figure 2A:
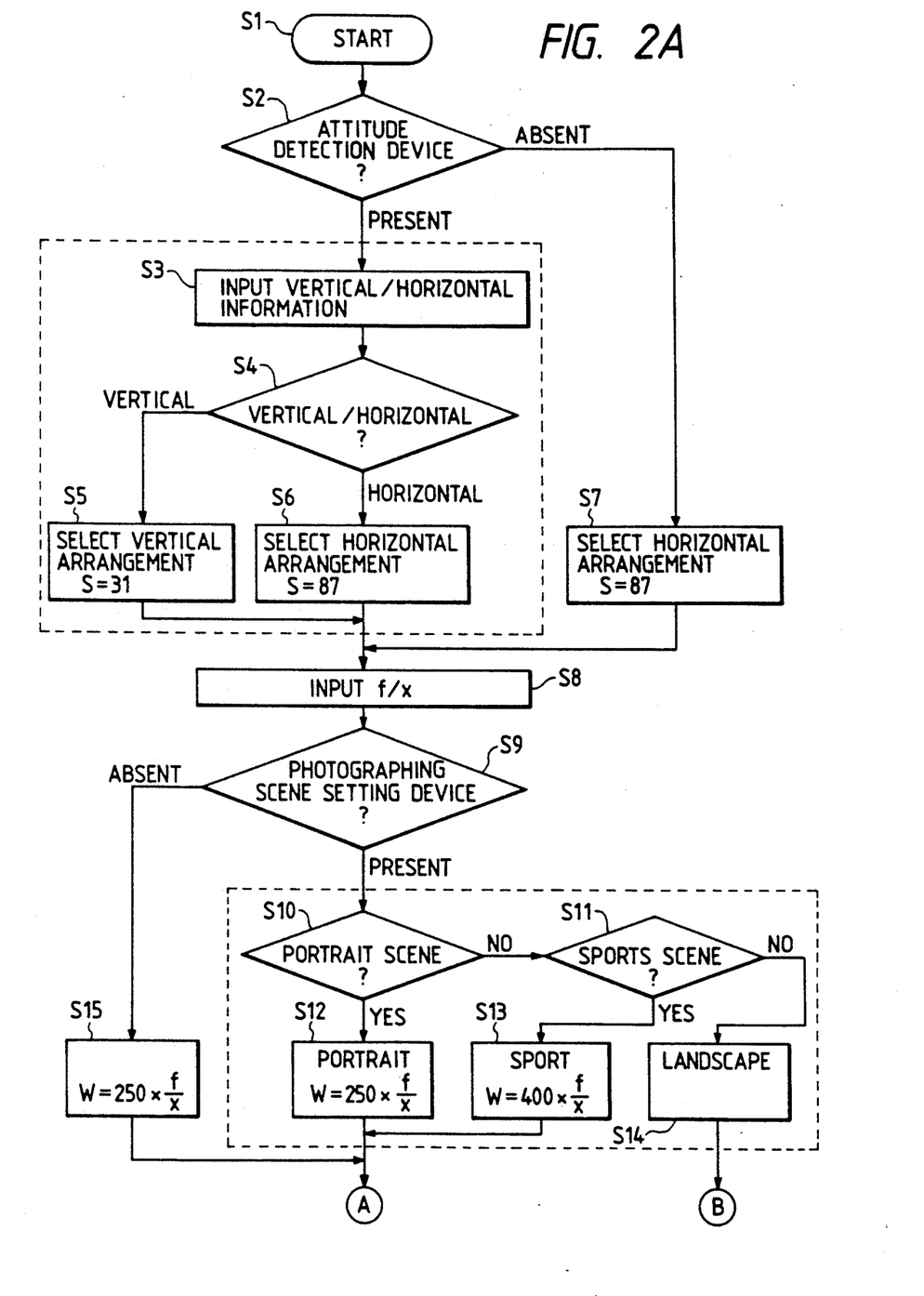
FIGS. 2A to 2C show details of a calculation process in the embodiment of the present invention.
Figure 2B:
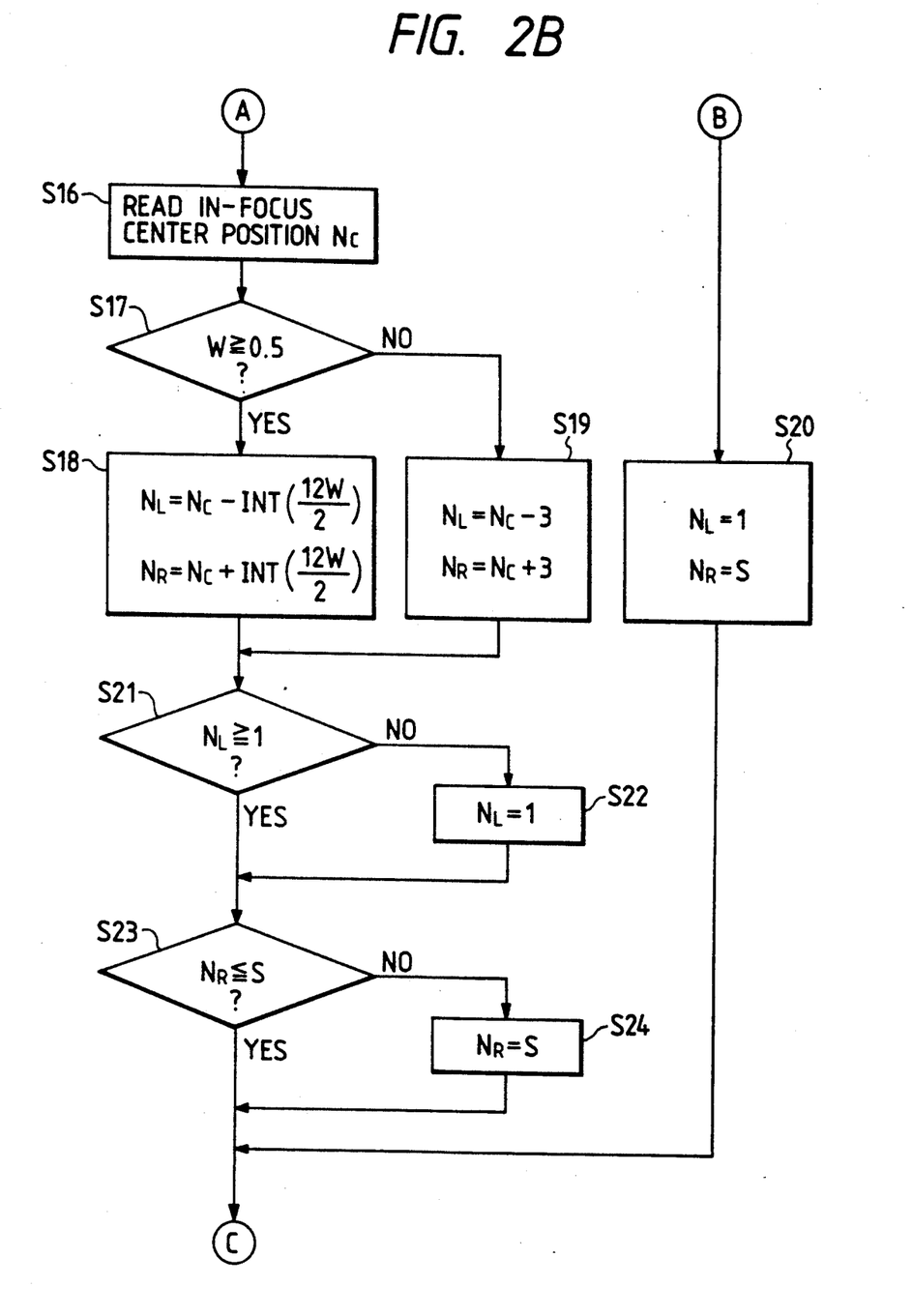
Figure 2C:
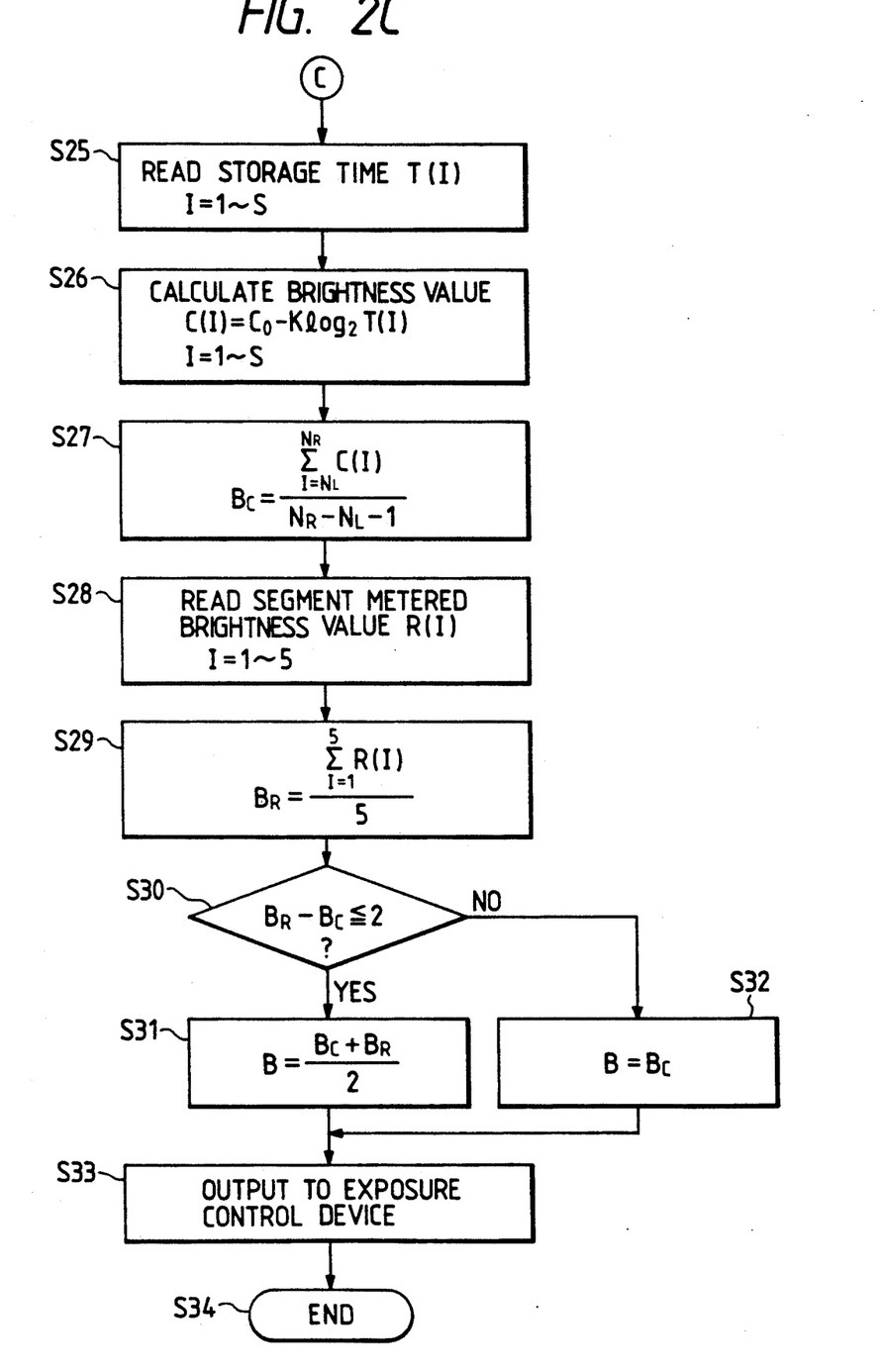

A calculation process in the present embodiment is now explained with reference to FIGS. 2A to 2C.

In a step Sa, the process is started and proceeds to a step S2.

In the step S2, the presence or absence of the attitude detection device 10 of the camera is determined. If the attitude detection device 10 is present, the attitude detection device 10 should be in an activated state. If the attitude detection device 10 is not activated even if it is present, it is determined that the attitude detection device 10 is absent.

If the absence (or non-activated state) is detected in the step S2, the process proceeds to a step S7 where the two horizontally arranged photo-electric conversion device arrays 3a and b shown in FIG. 4 are selected from the photo-electric conversion device arrays 3 and the value S is set to 87.

The numbers of the devices of the photo-electric conversion device arrays 3a and 3b are equal, and the value S represents the number of devices arrayed. The photo-electric conversion device arrays 3a and 3b have the devices thereof arranged and overlapped in one-to-one relation on the screen. They are numbered 1 through S from the left end to the right end on the screen.

After the value S has been set, the process proceeds to a step S8.

If the presence (and the activated state) is detected in the step S2, the process proceeds to a step S3.

In the step S3, information as to vertical or horizontal attitude of the camera is inputted from the attitude detection device 10. Then, the process proceeds to a step S4.

In the step S4, the vertical attitude or the horizontal attitude is determined. If the vertical attitude is detected, the process proceeds to a step S5.

In the step S5, the two vertically arranged photo-electric conversion device arrays 3c and 3d shown in FIG. 4 are selected from the photo-electric conversion device arrays 3 and the value S is set to 31.

The numbers of the devices of the photo-electric conversion device arrays 3c and 3d are equal, and the value S represents the number of arrays arranged. The photo-electric conversion device arrays 3c and 3d have the devices thereof arranged and overlapped in one-to-one relation. They are numbered with 1 through S from the top end to the bottom end on the screen.

After the value S has been set, the process proceeds to a step S8.

If the horizontal attitude is detected in the step S4, the process proceeds to a step S6. The two horizontally arranged photo-electric conversion device arrays 3a and 3b shown in FIG. 4 are selected from the photo-electric conversion device arrays 3, and the value S is set to 87. Then, the process proceeds to the step S8.

In the step S8, the photographing magnification f/x which is a ratio of the focal distance f (mm) of the imaging lens 1 and the photographing distance x (mm) is selected from various distance information supplied by the distance information output device 6. Then, the process proceeds to a step S9.

In the step S9, the presence or absence of the photographing scene setting device 7 is determined. If the photographing scene setting device 7 is present, the device should be in a set state. If the device is in a non-set state even if it is present, it is determined as the absence of the device 7.

If the decision is absent (or non-set state), the process proceeds to a step S15.

In the step S15, the following calculation is performed to determine a value W.

$$W = 250 \times \frac{f}{x}$$

where W is a width on the screen of an image of a principal object focused by the imaging lens 1, for which a proper exposure is to be given.

For example, where a lens having a focal distance of 50 mm is used to focus an object which is 5 m ahead, the photographing magnification is given by $$f/x = 50/5000 = 1/100$$

and $$W = 250 \times 1/100 = 2.5 \text{ (mm)}.$$

If the photographing scene setting device 7 is absent (or in the non-set state), the setting for a portrait scene to be described later is used. This case is most probably portrait photographing and improper exposure should be most desirably avoided in portrait photographing.

After the calculation in the step S15, the process proceeds to a step S16.

If the decision in the step S9 is present (and in the set state), the process proceeds to a step S10.

In the step S10, whether the photographing scene has been set to the portrait scene or not is determined. If the portrait scene has been set, the process proceeds to a step S12.

In the step S12, the value W is determined by the following formula.

$$W = 250 \times \frac{f}{x}.$$

A coefficient 250 is a value to define a proper range which has been obtained by statistically processing results of a number of portrait photographing.

Where the portrait scene has been set, the primary object is a person who is static or almost static. Accordingly, the value W which represents the width of the object may be fairly limited.

After the calculation, the process proceeds to the step S16.

If the photographing scene has not been set to the portrait scene in the step S10, the process proceeds to a step S11 to determine if it has been set to a sport scene. If it has been set to the sport scene, the process proceeds to a step S13.

In the step S13, the value W is determined by the following formula.

$$W = 400 \times \frac{f}{x}.$$

A coefficient 400 is a value to define a proper range which has been obtained by statistically processing the results of a number of sport scene photographing.

Where the sport scene has been set, the principal object is person, animal or vehicle which moves fast and widely. Accordingly, the value W which represents the width of the object should be set larger than that for the portrait scene.

After the calculation, the process proceeds to the step S16.

If the sport scene has not been set in the step S11, the process proceeds to a step S14.

In the step S14, a landscape scene is set.

Where the landscape scene is set, it is statistically known that it is proper to limit a light metering area by a magnitude of an angle of view rather than a size or distance of a principal object. Accordingly, it is proper to use all devices 1 through S of the photo-electric conversion device arrays instead of the selection by the magnification f/x. Thus, the process proceeds to a step S20.

In the step S16, the selection device 12 determines the device (FIG. 3) in the photo-electric conversion device arrays 3 at which the defocusing is minimum, that is, in-focus is most attained, and reads in the number $N_C$ of that position. $N_C$ is selected from the device positions 1 through S.

In the focus detection, the amount of defocusing is normally determined for each of the devices (not shown) of the photo-electric conversion device arrays 3. If the amount of defocusing is within ±50 microns, it is usually said that the object is in an in-focus range, and when it is closest to zero, it is said that the object is at an in-focus center. The number $N_C$ is usually defined at the position corresponding to the in-focus center, but in a camera having a tracking device, it may be defined at an anticipated in-focus position. In this case, the position of the infocus center is used as a reference to define the number $N_C$.

After the number $N_C$ has been read, the process proceeds to a step S17.

In the step S17, whether $W \geq 0.5$ is met or not is determined.

W=0.5 corresponds to 0.5 mm on the screen. This corresponds to a width of a nose of a person who is 5 m ahead of a lens having a focal distance of 50 mm. This is used as the predetermined width. It is a practically significant minimum width.

When $W \geq 0.5$, that is, when the width of the principal object is larger than the predetermined width on the image plane, the process proceeds to a step S18.

When $W < 0.5$, that is, when the width of the principal object is less than the predetermined width on the image plane and too narrow to use it as a light metering area, the process proceeds to a step S19.

Figure 3A:
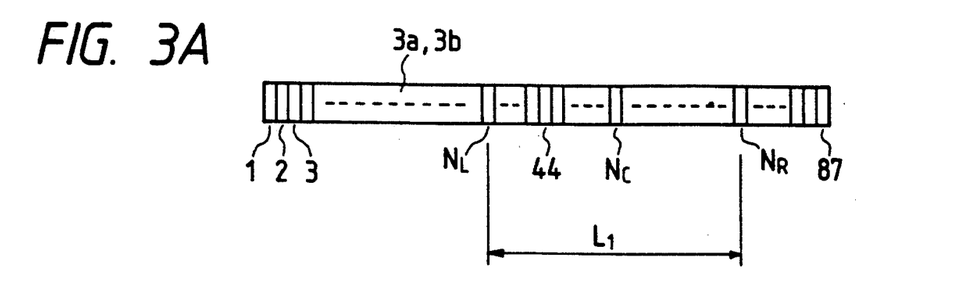
FIGS. 3A and 3B show a positional relationship of $N_C$, $N_L$ and $N_R$ on photo-electric conversion device arrays 3a to 3d.

In the steps S18 to S20, the number $N_L$ of the device at one end of the devices of the photo-electric conversion device arrays 3a to 3d which are used for the light metering and the number $N_R$ of the device at the other end of the devices used for the light metering are determined. For example, in the horizontal arrangement, the number of the leftmost device of the area $L_1$ of the devices used for the light metering is $N_L$. and the number of the rightmost device is $N_R$, as shown in FIG. 3A.

Figure 3B:
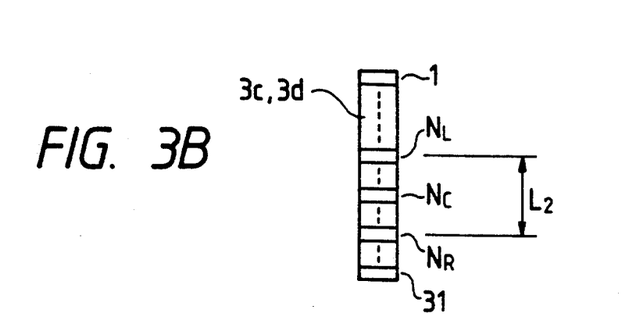

In the vertical arrangement, the number of the uppermost device of the area $L_2$ of the devices used for the light metering is $N_L$, and the number of the lowermost device is $N_R$, as shown in FIG. 3B.

In the step S18, $N_L$ and $N_R$ are determined by the following formulas and the process proceeds to a step S21.

$$N_L = N_C - INT\left(\frac{12W}{2}\right)$$

$$N_R = N_C + INT\left(\frac{12W}{2}\right)$$

where INT( ) is an operation symbol which means an integer portion in ( ).

For example, when f=50 mm and x=3×10³ mm in the portrait scene, $$W = 250 \times \frac{50}{3 \times 10^3} = 4.17.$$

Accordingly, $$N_L = N_C - 25$$

$$N_R = N_C + 25.$$

Thus, 25 devices on both sides of $N_C$ as center, that is, 51 devices in total are used for the light metering out of the photo-electric conversion device arrays 3.

In another example, when f=200 mm and x=20×10³ mm in the sport scene, $$W = 250 \times \frac{200}{20 \times 10^3} = 2.5.$$

Accordingly, $$N_L = N_C - 15$$

$$N_R = N_C 15.$$

Thus, 15 devices on both sides of $N_C$ (as center) that is, 31 devices in total are used for the light metering out of the photo-electric conversion device arrays 3. Then, the process proceeds to the step S21.

In the step S19, $$N_L = N_C - 3$$

$$N_R = N_C + 3.$$

Thus, 3 devices on both sides of $N_C$, as center, that is, seven devices in total are used for the light metering. Then, the process proceeds to the step S21.

In the step S21, if $N_L < 1$, the process proceeds to a step S22. In the step S22, $N_L$ is set to 1 and the process proceeds to a step S23.

In the step S21, if $N_L \geq 1$, the process proceeds to the step S23.

In the step S23, if $N_R > S$, the process proceeds to a step S24. In the step S24, $N_R$ is set to S and the process proceeds to a step S25.

In the step S23, if $N_R \leq S$, the process proceeds to the step S25.

The processes in the steps S21 to S24 are to prevent $N_L$ or $N_R$ from being smaller than 1 or larger than S to go out of the range of the photo-electric conversion device arrays 3.

In the step S20, $$N_L = 1$$

$$N_R = S.$$

Thus, entire arrays of the selected photo-electric conversion device arrays 3a and 3b, that is, 87 devices of each of the photo-electric conversion device arrays 3a and 3b when the camera is in the horizontal attitude, and 31 devices of each of the photo-electric conversion device arrays 3c and 3d when the camera is in the vertical attitude are used for the light metering. For the landscape scene, the devices are used widely because the angle of view of the principal object is usually large.

In the step S25, storage times T(I) of the S devices of each of the photo-electric conversion device arrays 3a to 3d are read. Then, the process proceeds to a step S26.

In the step S26, the brightness value for each device is calculated by the formula $$C(I) = C_0 - K \log_2 T(I)$$

where Co is a conversion constant and K is a conversion coefficient.

In the steps S25 and S26, as an alternative method for calculating the brightness value from the stored charge and the storage time by the brightness calculation device 11, the stored charge in a fixed storage time may be read. In the present embodiment, however, storage time T(I) is read.

In a step S27, the brightness value BC of the area $L_1$ or $L_2$ of the devices selected for the light metering is calculated by the exposure calculation device 13 by the following formula:

$$B_C = \frac{\sum_{I=N_L}^{N_R} C(I)}{N_R - N_L - 1}.$$

Then, the process proceeds to a step S28. In the step S28, the five light metering brightness values R(I) are read from the light metering devices 8 through the light metering circuit 9. Then, the process proceeds to a step S29.

In the step S29, the brightness value $B_R$ for the entire image is calculated by the following formula.

$$B_R = \frac{\sum_{I=1}^{5} R(I)}{5}.$$

Then, the process proceeds to a step S30.

In the step S30, when $B_R - B_C \leq 2$, that is, when a difference between the brightness values at the center of the image and the entire image is small, the process proceeds to a step S31.

In the step S31, a brightness value B is calculated by the following formula.

$$B = \frac{B_C + B_R}{2}.$$

Namely, a mean value of the brightness values at the center of the image and the entire image is calculated to make the entire image harmonious.

If $B_R - B_C > 2$ in the step S30, that is, when the center of the image is lighter than the entire image by more than 2 EV, the process proceeds to a step S32.

In the step S32, the brightness value B is calculated by the following formula.

$$B = B_C.$$

Namely, the brightness at the center of the image rather than the brightness of the entire image is adopted to set a proper exposure such that the principal object is clearly displayed in the entire image.

The calculation by the exposure calculation device 13 is completed in the step S31 or S32. The process then proceeds to a step S33.

In the step S33, the brightness value B is finally supplied to the exposure control device, and step S34 ends the process.

In accordance with the present invention, the range of the principal object can be more precisely determined than by the classification, by using the setting of the photographing scene by the photographer.

The brightness output to be used for the exposure calculation is selected from the brightness outputs generated by the light metering device, based on the output of the photographing scene setting device which is set by the photographer.

As a result, the statistic misjudgement is less than that by the scene classification, and the principal object can be caught more precisely and the probability of proper exposure is improved.

Accordingly, the photographer may more easily photograph with proper exposure.

What is claimed is:

1. A camera comprising:
   light receiving means for receiving light from a plurality of areas on an object field and generating a plurality of brightness signals corresponding to said plurality of areas;
   photographing scene setting means responsive to an operation by a photographer for setting a photographing scene selected from a plurality of different types of objects that may be photographed and producing first information corresponding to the set photographing scene;
   photographing condition detecting means responsive to a condition of said camera for producing second information which is related to the condition of said camera and different from the photographing scene; and
   exposure determining means for determining an exposure value based on said plurality of brightness signals, said first information and said second information.

2. A camera according to claim 1, wherein said exposure determining means has selecting means for selecting a part of said plurality of brightness signals on the basis of said first and said second information and means for calculating the exposure value.

3. A camera according to claim 1, which further comprises means for detecting an attitude of the camera to produce an attitude signal, wherein said light receiving means selects a part of said plurality of brightness signals in response to said attitude signal.

4. A camera according to claim 1, wherein said photographing scene setting means is capable of setting a sport scene in which a primary object moves and a portrait scene in which a primary object is almost static, and wherein the number of said selected brightness signals in said sport scene is larger than the number of said selected brightness signals in said portrait scene.

5. A camera according to claim 4, which further comprises focus detecting means for detecting the focus condition of a photographing lens in response to outputs of said light receiving means.

6. A camera according to claim 5, wherein said second information is related to a distance from said camera to the object.

7. A camera according to claim 6, wherein said second information is related to a focal distance of a photographing lens.

8. A camera according to claim 1, wherein said photographing scene setting means is capable of setting a sport scene in which a primary object moves.

9. A camera according to claim 1, wherein said photographing scene setting means is capable of setting a portrait scene in which a primary object is static.

10. A camera according to claim 1, wherein said photographing scene setting means is capable of setting a landscape scene.

11. A camera comprising:
    light receiving means for receiving light through a photographing lens form two areas on an object field and generating a plurality of light intensity distribution signals corresponding to said two areas, one of said two areas being extended in a horizontal direction and the other of said two areas being extended in a vertical direction when said camera is held in a horizontal attitude;
    focus condition detecting means for detecting a focus condition of said photographing lens on the basis of said plurality of light intensity distribution signals;
    attitude detecting means for detecting an attitude of the camera to produce an attitude signal;
    photographing scene setting means responsive to an operation by a photographer for setting a photographing scene selected from a plurality of different types of objects that may be photographed and producing first information corresponding to the set photographing scene;
    photographing condition detecting means responsive to a condition of said camera for producing second information which is related to the condition of said camera and different from the photographing scene;
    selecting means responsive to said attitude signal for selecting a part of said plurality of light intensity distribution signals corresponding to one of said two areas; and
    exposure calculating means for calculating an exposure value based on the selected part of said plurality of light intensity distribution signals, said first information and said second information.

* * * * *